United States Patent
Hunt, Jr. et al.

(10) Patent No.: US 8,740,168 B2
(45) Date of Patent: Jun. 3, 2014

(54) CRYOGENICALLY COOLED DETECTOR PIN MOUNT

(75) Inventors: William E. Hunt, Jr., Fremont, CA (US); Michael P. Chrisp, Danville, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 463 days.

(21) Appl. No.: 13/046,924

(22) Filed: Mar. 14, 2011

(65) Prior Publication Data

US 2012/0234522 A1 Sep. 20, 2012

(51) Int. Cl.
*A47B 91/00* (2006.01)
*A47G 29/00* (2006.01)
*B65D 19/00* (2006.01)
*G01J 5/02* (2006.01)

(52) U.S. Cl.
USPC ...................... 248/346.01; 250/352

(58) Field of Classification Search
USPC ............................ 248/187.1; 250/352, 370.15
See application file for complete search history.

(56) References Cited

U.S. PATENT DOCUMENTS

| | | | | |
|---|---|---|---|---|
| 3,807,188 | A * | 4/1974 | Lagodmos | 62/51.1 |
| 4,194,119 | A * | 3/1980 | MacKenzie | 250/352 |
| 4,501,131 | A * | 2/1985 | Gaskin et al. | 62/51.1 |
| 5,598,966 | A * | 2/1997 | Romano et al. | 228/124.6 |
| 6,122,051 | A * | 9/2000 | Ansley et al. | 356/326 |
| 6,122,919 | A * | 9/2000 | Patel et al. | 62/51.1 |
| 6,144,031 | A * | 11/2000 | Herring et al. | 250/352 |
| 6,156,978 | A * | 12/2000 | Peck et al. | 174/151 |
| 6,417,514 | B1 * | 7/2002 | Eneim et al. | 250/352 |
| 6,675,600 | B1 * | 1/2004 | Robillard et al. | 62/259.2 |
| 6,909,495 | B2 * | 6/2005 | Huston et al. | 356/43 |
| 7,078,803 | B2 * | 7/2006 | Tilton et al. | 257/714 |
| 7,609,381 | B2 | 10/2009 | Warren | |
| 7,808,635 | B2 | 10/2010 | Chrisp | |
| 2007/0274714 | A1 * | 11/2007 | Achal et al. | 398/43 |
| 2008/0024871 | A1 * | 1/2008 | Achal et al. | 359/615 |
| 2010/0053609 | A1 * | 3/2010 | Chrisp | 356/328 |
| 2012/0187297 | A1 * | 7/2012 | Mullins et al. | 250/352 |

* cited by examiner

*Primary Examiner* — Darnell Jayne
*Assistant Examiner* — Andrew Roersma
(74) *Attorney, Agent, or Firm* — Eddie E. Scott

(57) ABSTRACT

A focal plane assembly facilitates a molybdenum base plate being mounted to another plate made from aluminum. The molybdenum pin is an interference fit (press fit) in the aluminum base plate. An annular cut out area in the base plate forms two annular flexures.

1 Claim, 4 Drawing Sheets

CRYOGENICALLY COOLED DETECTOR PIN MOUNT

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to cameras and more particularly to a pin mount for a cryogenically cooled detector.

2. State of Technology

U.S. Pat. No. 7,609,381 to David Wheeler Warren issued Oct. 27, 2009 for a compact, high-throughput spectrometer apparatus for hyperspectral remote sensing provides the state of technology information below.

Hyperspectral imaging is an extremely powerful and broadly applied technique of optical remote sensing. It consists of imaging an object or scene in a multitude of contiguous wavelength intervals. As distinct from multi-spectral imaging, where the wavelength intervals are typically defined by a relatively small number (e.g., <12) of discrete optical bandpass filters, hyperspectral imaging employs a larger number of finer spectral intervals in order to more reliably detect and discriminate between the unique spectral characteristics of natural and artificial materials.

As a tool of remote sensing, for example in geology or astronomy, hyperspectral imaging is generally practical only in wavelength regions where the earth's atmosphere is transparent over ranges of many kilometers and not affected by absorption from atmospheric constituents such as carbon dioxide and water vapor. These regions include the visible and near-infrared (VNIR: 0.4-1.0 µm), short-wave infrared (SWIR: 1.0-2.5 µm), mid-wave infrared (MWIR: 3.0-5.0 µm), and long-wave infrared (LWIR: 8.0-14.0 µm). Depending on the mission and phenomenology of interest, it is common to divide one of these broad spectral regions into 10s or 100s of sampled spectral sub-intervals. Typical numbers range from 32 to 512. These modest spectral resolutions are most practically achieved with spectrometers based on dispersive prism or diffraction grating elements.

In addition to large numerical aperture, spectrometers for hyperspectral remote sensing must have good image quality relative to the size of the detector element. For reliable processing and interpretation of the hyperspectral data, they should also have low image distortions such that the length of the slit image should not change with wavelength (keystone) and the dispersed position of the slit image for a given wavelength should not change with position along the slit (smile). These distortions should be controlled to a small fraction (e.g., <1/10) of a pixel dimension.

Finally, spectrometers intended for aircraft or satellite use, where volume and mass are often highly constrained, must be as compact as possible. This is particularly true of instruments operating at infrared wavelengths, where the entire instrument is cooled to cryogenic temperatures and demands on cooling resources increase dramatically with instrument volume.

U.S. Pat. No. 7,808,635 to Michael P. Chrisp issued Oct. 5, 2010 for a wide swath imaging spectrometer utilizing a multimodular design provides the state of technology information below.

These compact arrangements of the imaging spectrometers modules use smaller cryogenic coolers, in the case of infrared systems, facilitating their use in small, medium, and large manned and unmanned aerial vehicles for remote gas detection and detection of solids with characteristic spectral features in the longwave or midwave infrared regimes. These instruments have application for Homeland Defense to check for the presence of potential WMD production and/or use activities without entering the contaminated areas. They also have application for space sensors, where the wide-swath width is extremely important because scenes can only be viewed once an orbit. The wider field of view of this design enables larger swath widths for the remote sensing of larger areas with single pass overflights, and additional spectrometer modules can be added until the field of view of the telescope is completely utilized.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a pin mount for a cryogenically cooled detector. The present invention includes a focal plane assembly (FPA) that facilitates a molybdenum base plate being mounted to another plate made from aluminum. The mounting components include a molybdenum pin. The molybdenum base plate and the pin can be one piece or two pieces. The aluminum plate has a specific hole design into which the molybdenum pin is press-fitted with a well-controlled interference fit. The aluminum plate can be made from other materials with adjustment of the degree of interference fit with the molybdenum pin. Molybdenum is a dense material, often brittle at cryogenic temperatures, and difficult to machine. Transitioning from the molybdenum FPA base plate to the lighter aluminum base plate with better ductility at cryogenic temperatures and better machinability is highly advantageous. The hole design in the aluminum plate includes an annular cut out area that forms two annular flexures. The annular flexures allow two dissimilar materials with different thermal expansion rates to maintain relative position to each other through many thermal cycles thus maintaining the alignment of the detector. The two flexures allow the molybdenum pin and the aluminum base plate to expand and contract and still maintain the alignment of the detector.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
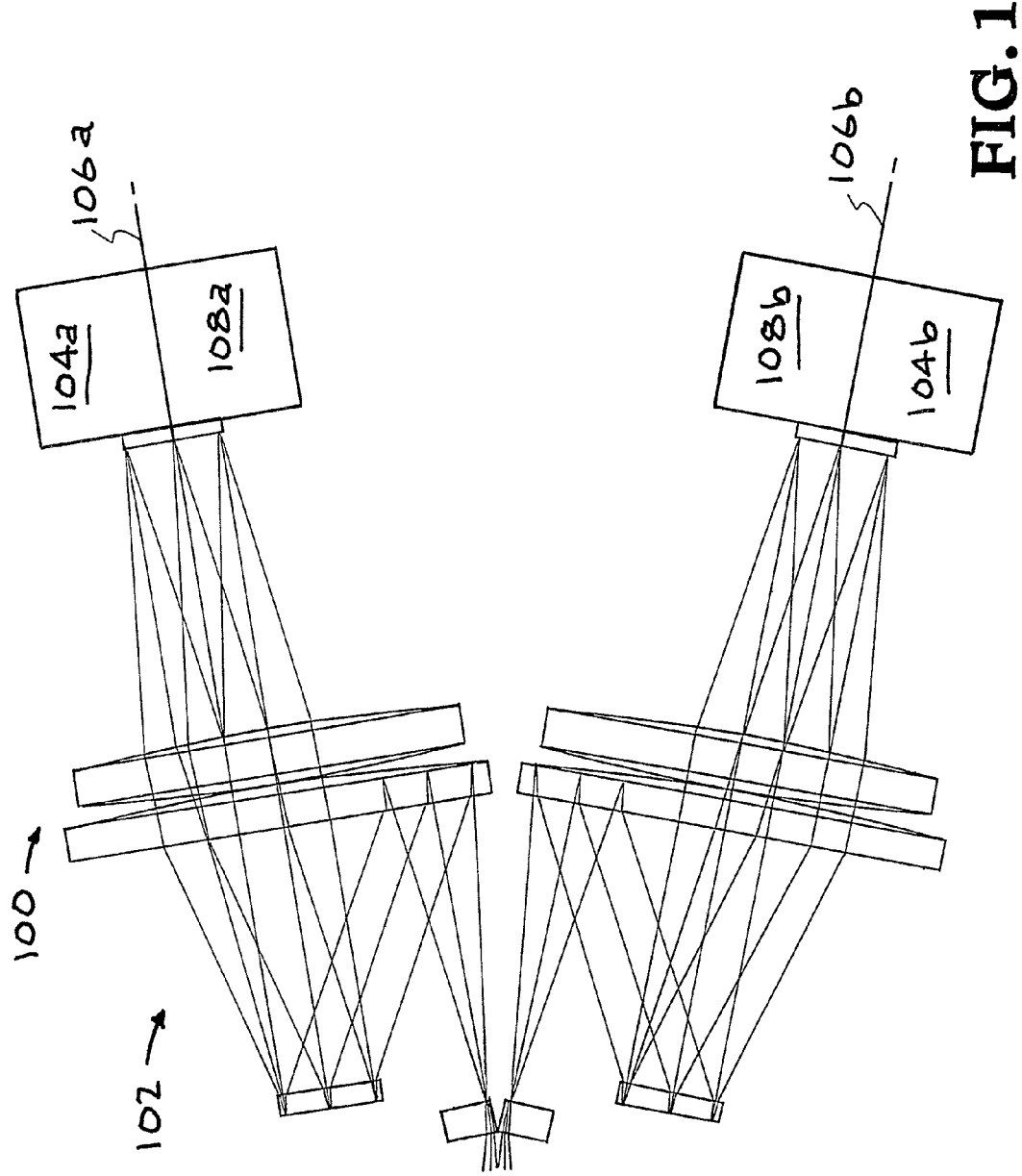
FIG. 1 illustrates one embodiment of a spectrometer incorporating the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, one embodiment of a spectrometer incorporating the present invention is illustrated. The spectrometer is designated generally by the reference numeral 100. The spectrometer 100 includes a camera system 102 and camera/detector systems 104a and 104b. The camera/detector systems 104a and 104b have center lines 106a and 106b respectively. Focal plane assemblies (FPA) 108a and 108b of the present invention are included in the camera/detector systems 104a and 104b.

The optical elements for the spectrometer 100 are mounted in a Dewar housing which is required for cooling to reduce the infrared background and for the detectors' operating temperature. The spectrometer 100 is a wide-swath imaging spectrometer that can be mounted in an airplane for pushbroom imaging. The multiple imaging spectrometer modules are arranged so that the images of their entrance slits overlap when projected onto the ground. This ensures that when they are swept over the ground, either by the aircraft motion, or by a pointing mechanism or additional scan mirror, there are no gaps in the spatial coverage. A similar arrangement can be used if the wide swath imaging spectrometer is mounted in an orbiting satellite.

Figure 2:
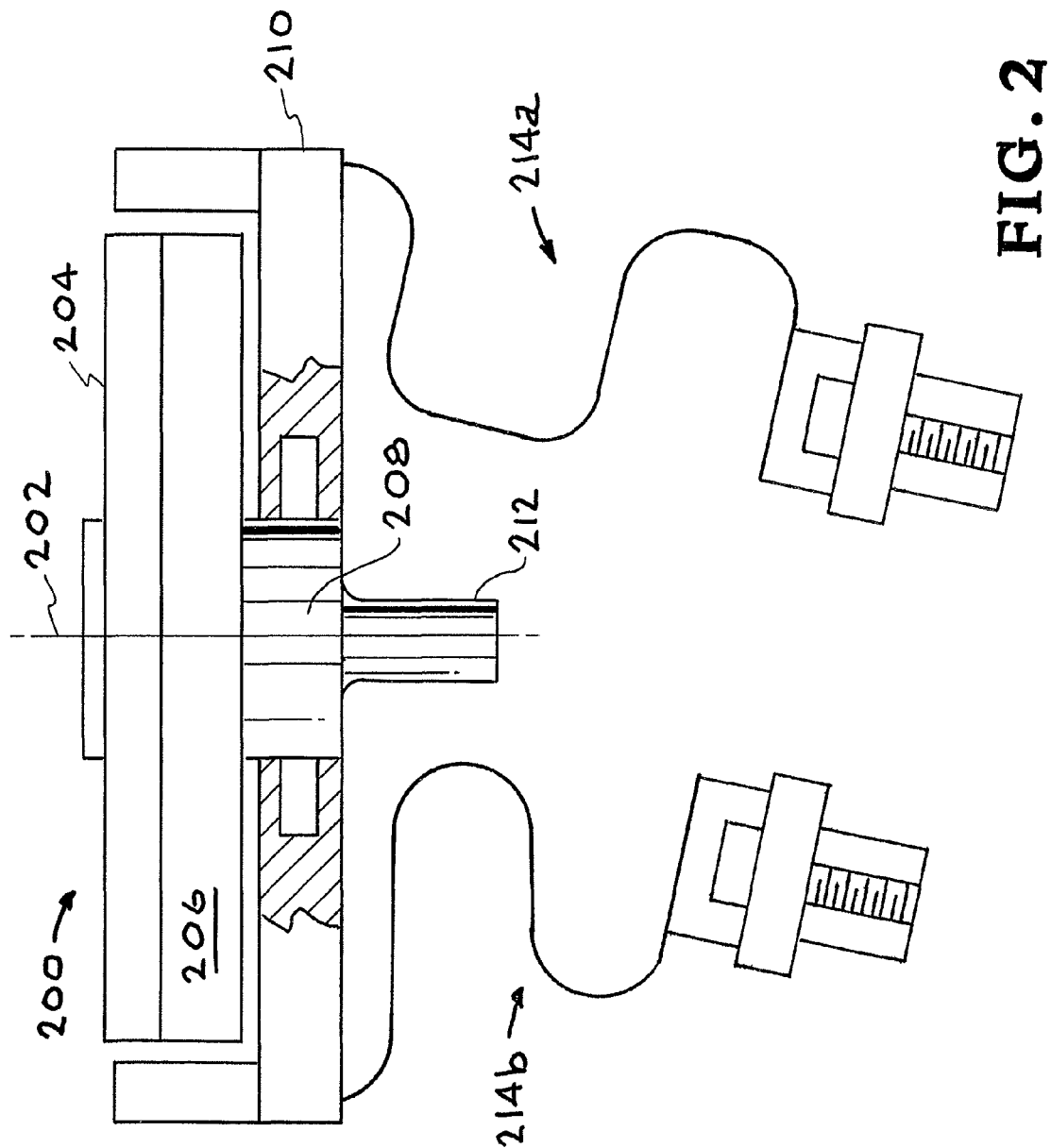
FIG. 2 illustrates an embodiment of a focal plane assembly (FPA) of the present invention.

Referring now to FIG. 2, an embodiment of a focal plane assembly (FPA) of the present invention is illustrated. The focal plane assembly (FPA) is designated generally by the reference numeral 200. The focal plane assembly 200 includes the following components: a camera/detector center line 202, a detector 204, a molybdenum base plate 206, a molybdenum pin 208, an aluminum base plate 210, a cold foot 212, and mounting system and electrical conductors 214a and 214b.

The focal plane assembly 200 facilitates the molybdenum base plate 206 being mounted to another plate 210 made from aluminum. The mounting components include the molybdenum pin 208. In the embodiment shown in FIG. 2 the molybdenum base plate 206 and the pin 208 are one piece. The aluminum plate 210 has a specific hole design into which the molybdenum pin 208 is press-fitted with a well-controlled interference fit. The aluminum plate 210 could be made from other materials with adjustment of the degree of interference fit with the molybdenum pin 208. Molybdenum is a dense material, often brittle at cryogenic temperatures, and difficult to machine. Transitioning from the molybdenum FPA base plate 206 to the lighter aluminum base plate 210 with better ductility at cryogenic temperatures and better machinablity is highly advantageous.

Figure 3:
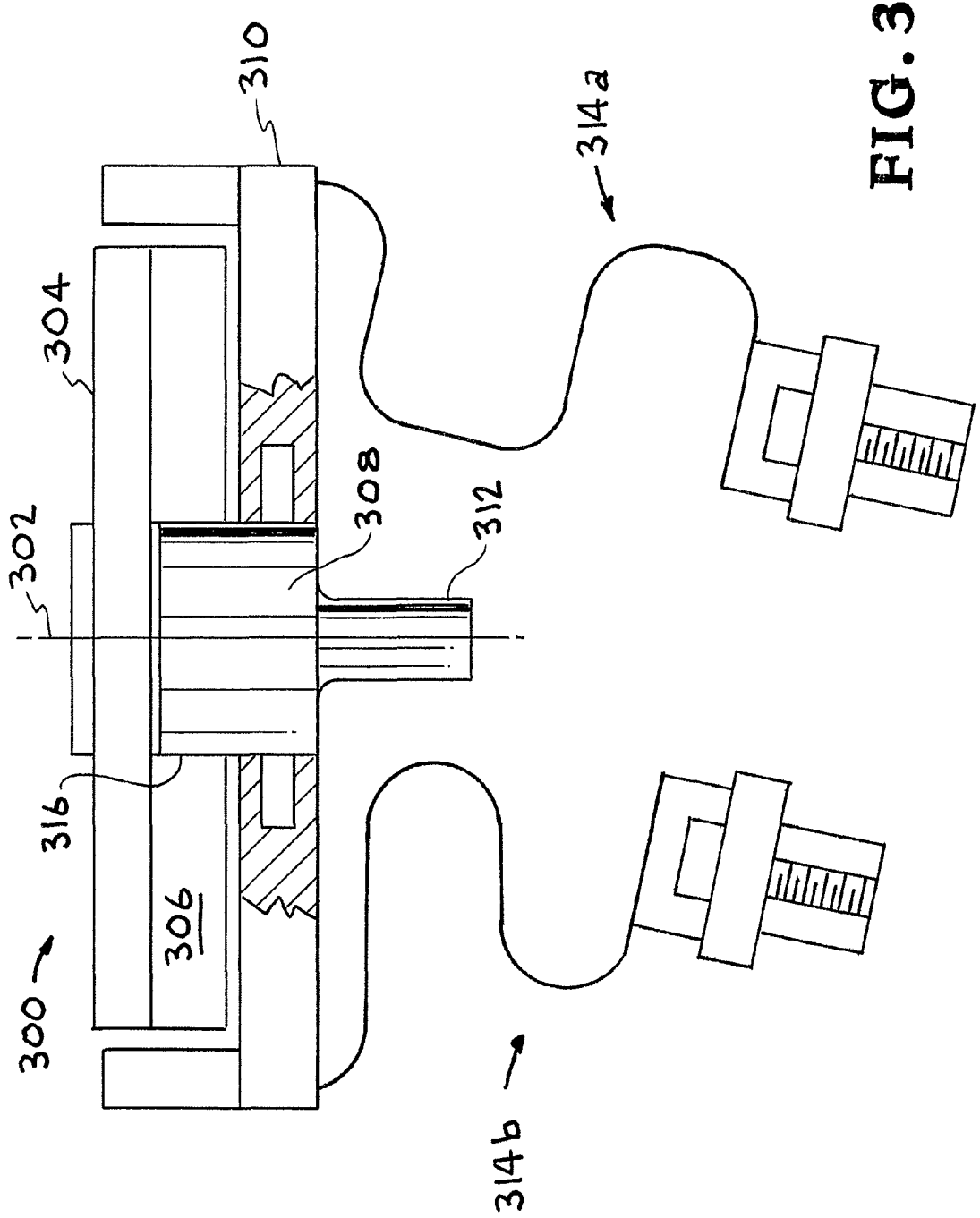
FIG. 3 illustrates another embodiment of a focal plane assembly (FPA) of the present invention.

Referring now to FIG. 3, an embodiment of a focal plane assembly (FPA) of the present invention is illustrated. The focal plane assembly (FPA) is designated generally by the reference numeral 300. The focal plane assembly 300 includes the following components: a camera detector center line 302, a detector 304, a molybdenum base plate 306, a pin 308, an aluminum base plated 310, a cold foot 312, and mounting system and electrical conductors 314a and 314b.

The focal plane assembly 300 facilitates the molybdenum base plate 306 being mounted to another plate 310 made from aluminum. The mounting components include the molybdenum pin 308. In the embodiment shown in FIG. 3 the molybdenum base plate 306 is connected to the pin 308 by epoxy 316. The aluminum plate 310 has a specific hole design into which the molybdenum pin 308 is press-fitted with a well-controlled interference fit. The aluminum plate 310 could be made from other materials with adjustment of the degree of interference fit with the molybdenum pin 308. Molybdenum is a dense material, often brittle at cryogenic temperatures, and difficult to machine. Transitioning from the molybdenum FPA base plate 306 to the lighter aluminum base plate 310 with better ductility at cryogenic temperatures and better machinablity is highly advantageous.

Figure 4:
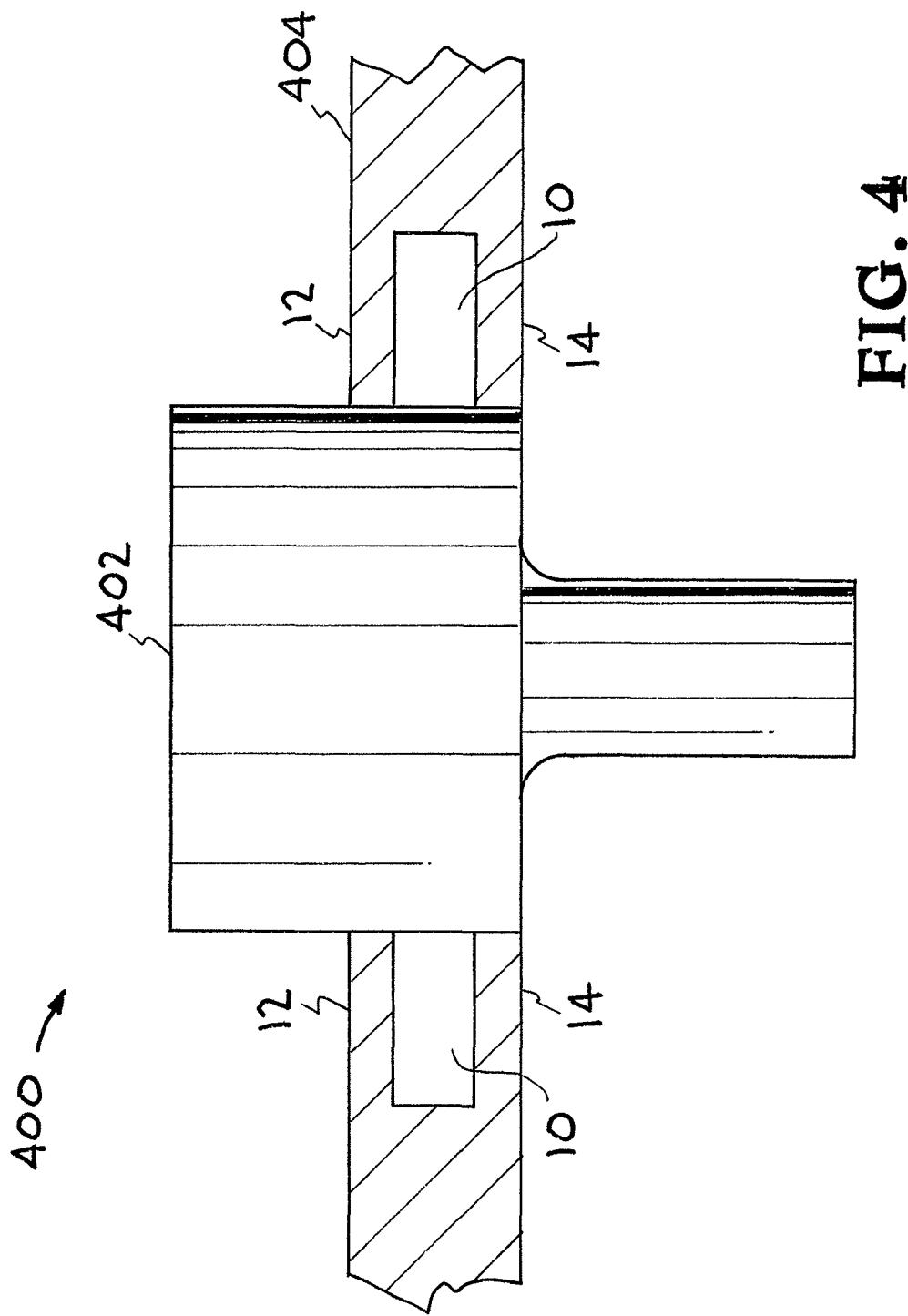
FIG. 4 is an enlarged view of one embodiment of the present invention shows only two parts of the focal plane assembly pin mount.

Referring now to FIG. 4, an enlarged view of one embodiment of the present invention shows only two parts of the focal plane assembly pin mount. The focal plane assembly pin mount is designated generally by the reference numeral 400. The two parts shown here are molybdenum pin 402 and aluminum base plate 404. All the other parts of the (FPA) are omitted for clarity. The molybdenum pin 402 is and interference fit (press fit) into the aluminum base plate 404. The annular cut out area 10 in the base plate 404 forms two annular flexures 12 and 14. The annular flexures allow two dissimilar materials with different thermal expansion rates to maintain relative position to each other through many thermal cycles thus maintaining the alignment of the detector. The two flexures 12 and 14 allow the molybdenum pin 402 and the aluminum base plate 404 to expand and contract and still maintain the alignment of the detector.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A wide-swath imaging spectrometer with a cryogenically cooled detector pin mount for pushbroom imaging, consisting of:
   a first wide-swath imaging spectrometer module with a first entrance slit,
   a second wide-swath imaging spectrometer module with a second entrance slit wherein said first entrance slit and said second entrance slit overlap during pushbroom imaging,
   both said first wide-swath imaging spectrometer module and said second wide-swath imaging spectrometer module including a camera/detector system,
a camera/detector system centerline,
a focal plane assembly on said camera/detector system centerline,
a cryogenically cooled detector in said focal plane assembly,
a molybdenum metal base plate connected to said cryogenically cooled detector,
a molybdenum metal pin projecting from said cryogenically cooled detector molybdenum metal base plate,
an aluminum metal base plate, and
a hole in said aluminum metal base plate wherein said aluminum metal base plate is connected to said molybdenum metal pin by an interference fit between said molybdenum metal pin and said hole in said aluminum metal base plate, wherein said molybdenum metal pin and said aluminum metal base plate have different thermal expansion rates because they are made of different metals.

* * * * *